United States Patent [19]
Cosenza

[11] Patent Number: 5,779,413
[45] Date of Patent: Jul. 14, 1998

[54] FASTENER SYSTEM HAVING IMPROVED LOCKING ELEMENT

[75] Inventor: Frank J. Cosenza, Santa Barbara, Calif.

[73] Assignee: Fairchild Holding Corp., Chantilly, Va.

[21] Appl. No.: 606,361

[22] Filed: Feb. 23, 1996

[51] Int. Cl.⁶ .................................................. F16B 37/12
[52] U.S. Cl. .................. 411/302; 411/303; 411/301; 411/324; 411/947
[58] Field of Search ..................... 411/303, 301, 411/302, 304, 324, 377, 429, 430, 310, 309, 947

[56] References Cited

U.S. PATENT DOCUMENTS

| | | | |
|---|---|---|---|
| 262,193 | 8/1882 | Wootten | 411/301 |
| 2,399,526 | 4/1946 | Warren | 411/301 |
| 2,727,551 | 12/1955 | Rees | 411/303 |
| 3,221,790 | 12/1965 | Poupitch | 411/301 |
| 3,635,272 | 1/1972 | Schaeffer | 411/303 |
| 3,643,722 | 2/1972 | Oestereicher | 411/334 |
| 4,043,239 | 8/1977 | DeFusco | 411/178 |
| 4,439,078 | 3/1984 | Dessouroux | 411/178 |
| 4,600,343 | 7/1986 | Frerejacques | 411/303 |

*Primary Examiner*—Brian K. Green
*Assistant Examiner*—Fredrick Conley
*Attorney, Agent, or Firm*—Irving Keschner

[57] ABSTRACT

A fastening system comprising a bolt having a threaded shaft portion with a major thread diameter and a member having an aperture formed therein, said aperture being threaded over a portion thereof, a locking element having a preformed thread configuration being positioned within said aperture.

18 Claims, 3 Drawing Sheets

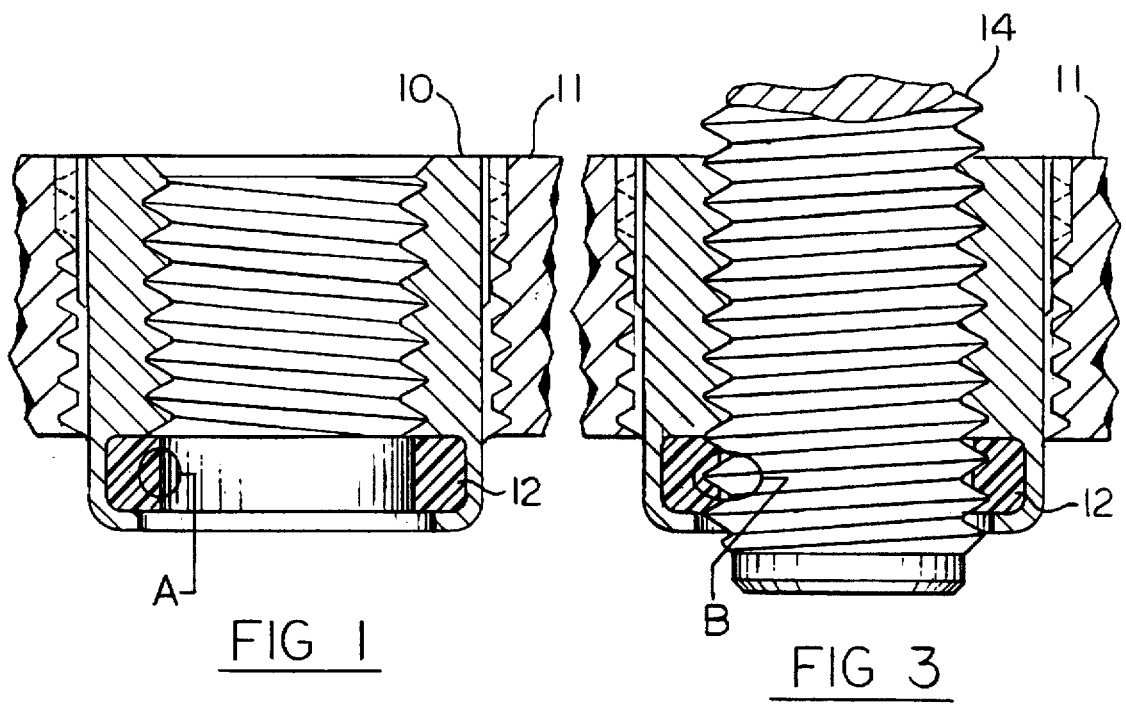
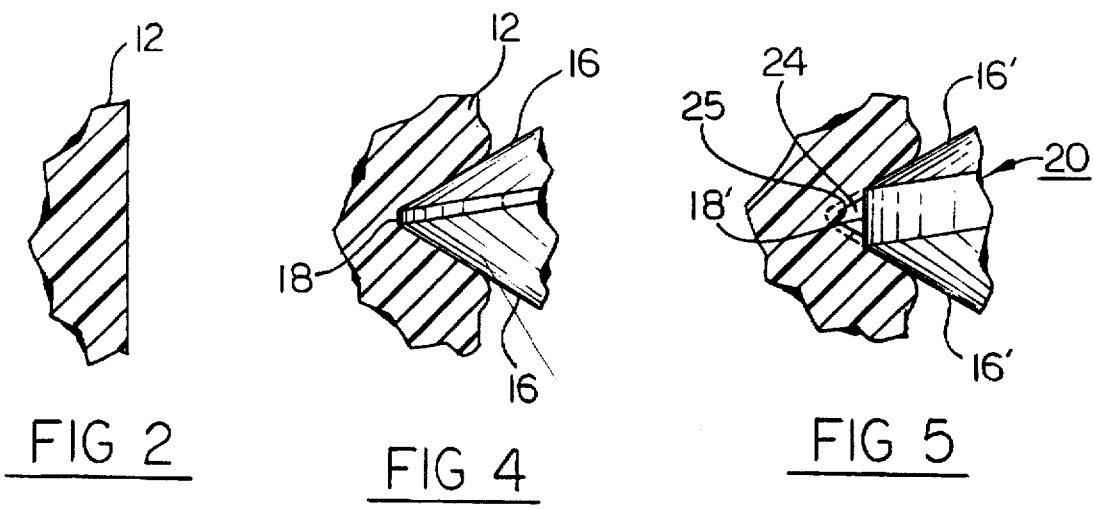

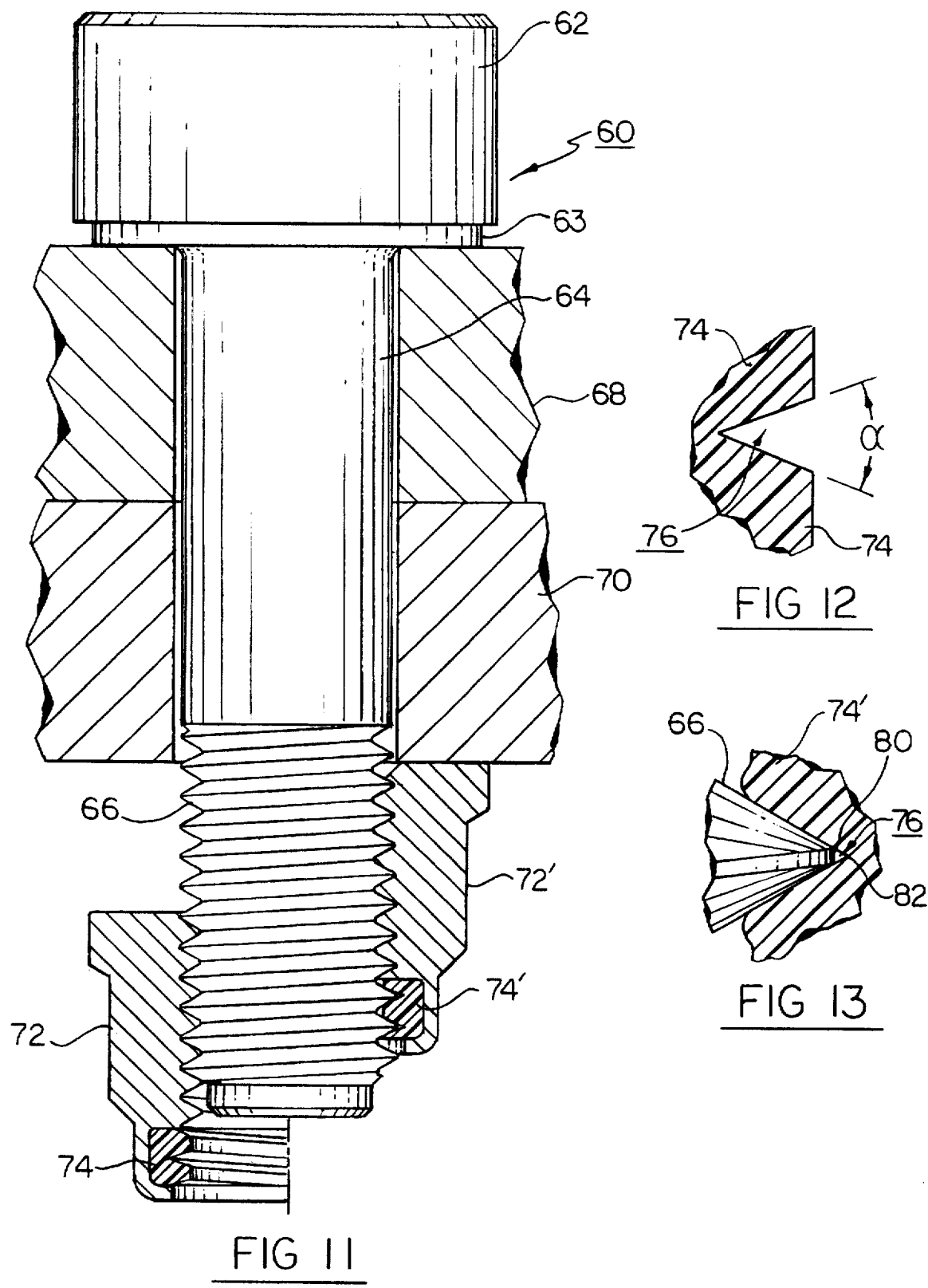

FASTENER SYSTEM HAVING IMPROVED LOCKING ELEMENT

BACKGROUND OF INVENTION

1. Field of Invention

The present invention relates to an improved locking element for use in a fastener system wherein a consistent and predictable prevailing torque is desired.

2. Description of Prior Art

The prior art has demonstrated many fasteners that utilize a large variety of locking elements to provide prevailing torques. As a result, attempts to provide consistent and predictable prevailing torque values have varied enormously. This has been historically a very difficult achievement due to the enormous amount of inherent variables that are associated with this process. Some of the variables include specified performance requirements, the amount of reuse cycles, variations in materials, material strengths, finishes, coatings, temperature plus myriads of other conditions that have influenced the predictability of prevailing torque values. Should the requirements demand repeatability of the prevailing torque over a large span of reuse cycles, the problem then becomes acute. When non-metallic locking elements, such as some common polymers are utilized, prevailing torque performance is somewhat improved due to the high elasticity factor of these materials. As a result, it allows ample adjustment to the variations of the bolt thread form and dimensional variations. The addition of temperature to both metallic and non-metallic locking type elements typically causes a reduction in cycle life. Although the performance of metallic locking elements traditionally withstand substantially higher temperatures, the polymer locking elements are limited to much lower levels and often have enormous difficulties achieving consistent results. The introduction of superpolymers has raised temperature limits to a higher level as compared to Nylon, for example, a commonly used polymer, and also has improved performance at these temperatures. Within published thread specifications, the major diameter of external threaded fasteners possesses, by a large margin, the widest amount of tolerance. This tolerance is generally a minimum of two and half times the tolerance of the pitch diameter. With this large dimensional variation, an externally threaded part, when used with certain high temperature superpolymers, frequently results in unacceptable prevailing torque values.

A typical installation procedure is to first thread the bolt into the metallic portion of the nut. As the bolt continues to engage the nut, the bolt eventually penetrates the polymer locking element, which is often located at the exit portion of the nut, and is typically unthreaded. The engagement of the bolt thread in the polymer locking element includes the surface of the major diameter plus the two flanks of the 60 degree thread form for a distance approximately equal to the pitch diameter of the bolt or the nut. The deformation and displacement of the polymer locking element conforms to the male thread configuration and induces friction, termed "prevailing torque", in either the installation or removal mode. It should be noted that the amount of deformation and distortion of the polymer locking element is at a maximum condition due to the male threads ability to displace material from the originally unthreaded condition. Once the bolt is removed, the polymer locking element reveals a female thread form that closely replicates the bolt's male thread form. During the initial insertion of the bolt into the polymer there is an enormous amount of material displacement, distortion, crushing, compressive fracturing and grinding that occurs. This massive disruption is due to the bolt furrowing its way through the polymer element that was not previously pre-formed. Depending on the type of polymer, this action will still produce adequate prevailing torque, however, for those polymers designed for higher temperatures, the results are often unacceptable. The result is that springback of polymers vary, while the lower temperature polymers are rather elastic, the "springback" effect is sufficient, while the higher temperature superpolymers are not as elastic, thus the amount of "springback" is usually minimized resulting in unacceptable performance. Further installation and removals results in a substantially lower prevailing torque in the locking element when the same bolt is re-installed. In the most frequent applications when the operator needs to disassemble the panel or structure, the bolt is disengaged and most likely will be replaced by another bolt of the same configuration. However, the next bolt may have a substantial reduction in the major diameter, all within the limits of the controlling specification. In this case, subsequent engagement into the same nut and formed thread of the locking element will result in a substantial lower prevailing torque. This is due to the fact that there are now only two elements affecting the prevailing torque: the pitch diameter and the 60° thread form. When the major diameter of the second bolt is smaller than the previous bolt's major diameter, there is an absence of contact between the formed major diameter of the locking element and the second bolt. Despite the small amount of the springback of the locking element, the result is a prevailing torque that is less than before. When the opposite condition prevails, that is initially a minimum major diameter bolt is engaged and then replaced with a maximum major diameter second bolt, the loads will rise dramatically, perhaps beyond the required specifications, and then drop back to a lower level than originally if the first bolt is then re-installed. The predictability of the prevailing torque is very inconsistent due to the large variation in the major diameter of various bolts utilized, regardless of the bolt's adherence to the specification requirements. Unfortunately, the prior art provides no opportunity to adjust or specify a predictable prevailing torque range prior to the first cycle. Once the original bolt imparts its form on the locking element, the control of torque values disappears.

It would be desirable to provide a fastener locking element which will provide a consistent and predictable prevailing torque between the locking element and the bolt notwithstanding variations in the major diameter of the bolt utilized.

SUMMARY OF THE PRESENT INVENTION

The present invention minimizes the impact of variations of the major diameter in fastener assemblies that utilize polymers and superpolymers locking elements for prevailing torque. This is accomplished by pre-forming the polymer or superpolymer (the generic term "polymer" will be used to encompass both polymers and superpolymers as appropriate) locking element with a thread configuration that only utilizes the elements of the closest thread tolerances, the 60 degree thread form and the pitch diameter of the bolt. The new pre-formed configuration possesses a thread form of less than 60 degrees and a major diameter that is larger than the maximum major diameter of the mating bolt. Thus, the major diameter of the bolt being utilized cannot contact or interfere with the major diameter of the internal thread form of the polymer locking element. The less than 60 degree thread form of the polymer locking element utilizes the normally very smooth flanks of the 60 degree thread form of the bolt to physically interfere with each other. These two smooth surfaces now produce friction that results in a very predictable prevailing torque. This design also controls the polymer performance, instead of the bolt chewing its way through, the new pre-formed thread now offers smooth surfaces and springback performance within its elastic limits.

With the design of the present invention the prevailing torque value desired can be adjusted and controlled by altering the total angle to less than 60 degree of the preformed thread in the polymer locking element. As an example, if the polymer locking element was pre-formed with a 40 degree thread form and subsequent testing deemed the prevailing torque too low, then by altering the thread form of the polymer locking element to some angle less than 35 degrees it would then automatically raise the prevailing torque value. The present invention thus eliminates one half of the major variables that affect consistent locking torques and allows a method of controlling and adjusting prevailing torque loads, features not available in the prior art. These variables originally were (1) the variations in the bolt's major diameter, (2) the variations in the furrowing and grinding effect of the bolts first cycle through the polymer, (3) variations in the 60° thread form and (4) the tolerance of the bolt's pitch diameter. It can be readily seen that this new design eliminates two of the most damaging and unpredictable variables and retains the closest tolerance items.

The present invention thus provides a simple and inexpensive technique of maintaining the consistency of prevailing removal torques in fasteners utilizing locking elements in the nut by pre-forming a polymer locking element with a predescribed thread form. In addition, the prevailing torque, if necessary, can be adjusted by simply altering the angle of the preformed thread.

DESCRIPTION OF THE DRAWING

For a better understanding of the invention as well as other objects and further features thereof, reference is made to the following description which is read in conjunction with the accompanying drawing wherein:

FIG. 1 is a partial cross-sectional view of an insert type fastener having a polymer locking element positioned therein;

FIG. 2 is a detail of the area A shown in FIG. 1, prior to bolt installation;

FIG. 3 illustrates a bolt with a major diameter at near maximum engaging the locking element shown in FIG. 1;

FIG. 4 is a detail of the area B shown in FIG. 3;

FIG. 5 is similar to FIG. 4 in that it illustrates the same area B if a bolt with a minimum major diameter engages the locking element shown in FIG. 1;

FIG. 11 is a partial cross-sectional view of a threaded nut type fastener system;

FIG. 12 is a detail of a portion of the locking element shown in FIG. 11; and

FIG. 13 illustrates a bolt with a major diameter engaging the locking element shown in FIG. 11.

DESCRIPTION OF THE INVENTION

Figures 6, 8:
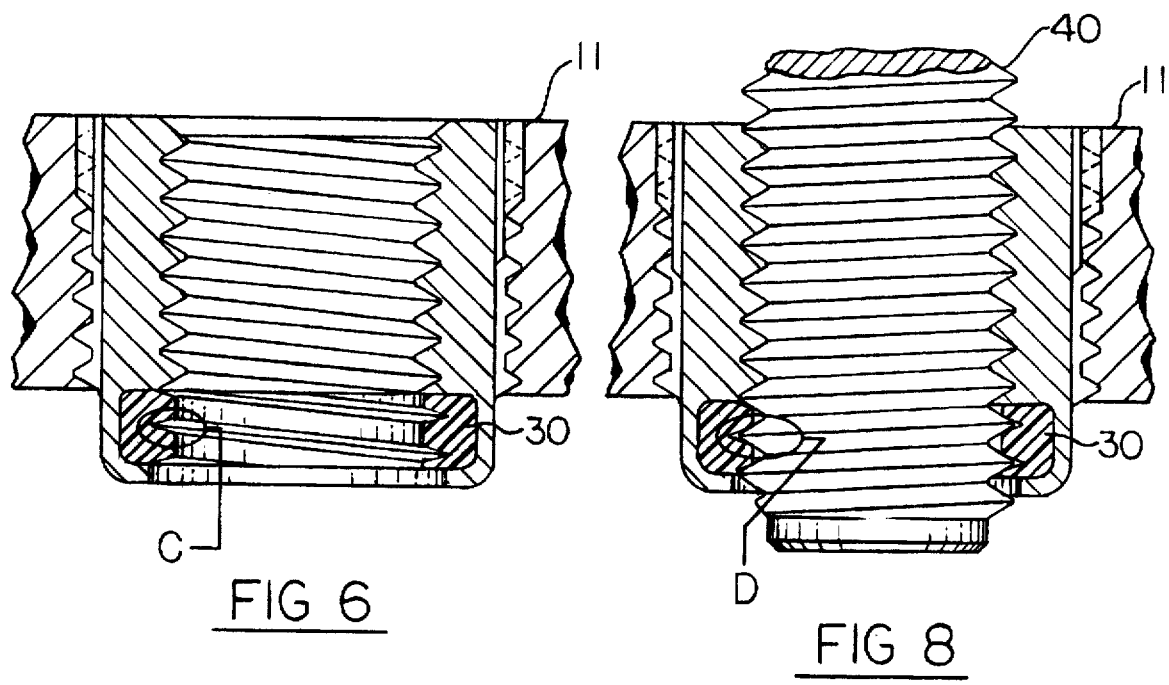
FIG. 6 is a partial cross-sectional view of a fastener having a locking element with a preformed thread configuration positioned therein in accordance with the teachings of the present invention.
FIG. 8 illustrates a bolt with a major diameter at near maximum engaging the locking element shown in FIG. 6.

Referring now to FIG. 1, a partial sectional view of a prior art threaded insert 10 positioned in parent material 11, a non-threaded locking element 12 being positioned therein as illustrated. Locking element 12 described herein is preferably non-metallic, fabricated from a polymer such as Nylon or from a superpolymer such as polyamide, polysulfone, polyphenylene sulfide, polyarylsulfone and aromatic polyester, but could be fabricated from metal if desired. FIG. 2 illustrates in more detail the area A prior to bolt installation shown in FIG. 1.

FIG. 3 illustrates a bolt, or similar type fastener 14, engaging element 12 and forming a thread in element 12. In the illustration, the major diameter of the bolt 14 is near a maximum value. FIG. 4 illustrates in more detail the area B in FIG. 3 and shows tip 18 of the major diameter of fastener 14 to be in substantial contact with the adjacent interior portions of the thread form, and in conjunction with the flanks 16 of the fastener, provide the mechanical variables for determining the user specified, prevailing torque value.

FIG. 5 is a detail illustrating the situation after fastener 14 has been removed from locking element 12 and a fastener having a minimum sized major diameter is installed in insert 10, it being desired that the same prevailing torque be provided as that provided by fastener 14 (the lines in phantom represent the material springback lines).

As is well known, the prevailing torque of a fastener system utilizing a locking element is dependent oh the friction surface contact areas of the fastener and the locking element. In the prior art installation illustrated in FIG. 5, the surface contact areas are adjacent the tip area 18' and the thread flanks 16'. However, the situation changes when a fastener 20 (only a portion thereof being illustrated) having a minimum major diameter is inserted into locking element 12. As shown in FIG. 5, a clearance gap 24 exists between the bottom of the tapped threaded area 25 formed by fastener 14 and the tip area 18' of fastener 20. In essence, because tip area 18' of fastener 20 is not in contact with bottom surface 25, the removal prevailing torque is lower than the prevailing torque designed for the original fastener installation as shown in FIGS. 3 and 4.

The present invention eliminates the major diameter variable from the design considerations of removal prevailing torque. In particular, polymer locking element 12 (as noted hereinabove, the term "polymer" as utilized in the specification hereafter includes polymers and superpolymers) is pre-formed with a thread configuration that only utilizes the elements of the closest thread tolerances. These elements are the thread form (standard is 60°) and the pitch diameter of the bolt.

Figures 7, 9, 10:
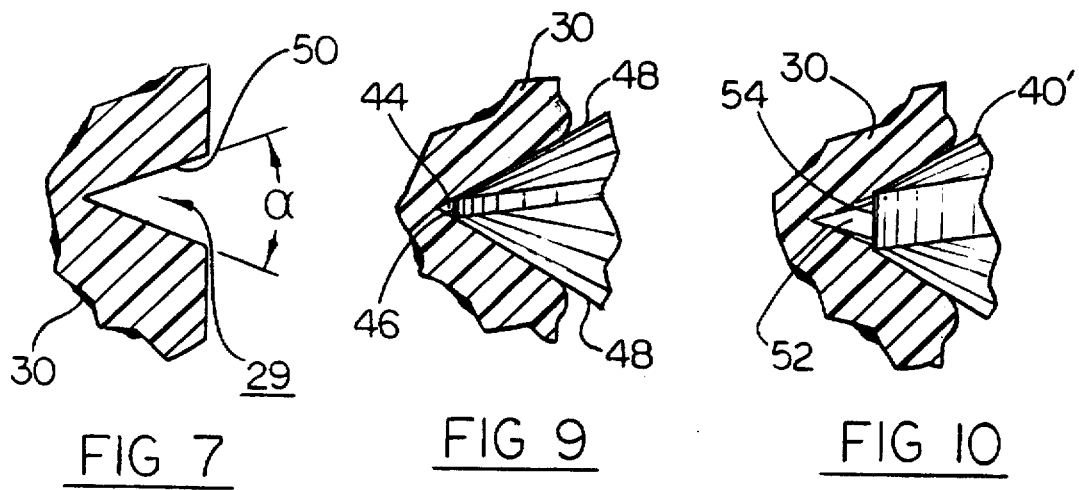
FIG. 7 is a detail of the area C shown in FIG. 6, prior to bolt installation.
FIG. 9 is a detail of the area D shown in FIG. 8.
FIG. 10 is similar to FIG. 9 in that it illustrates the same area D if a bolt with a minimum major diameter engages the locking element shown in FIG. 6.

In particular and as illustrated in the partial sectional view of FIG. 7, a thread configuration 29 (helical groove that extends around the inner diameter of locking element 30) having a thread form a of less than 60 degrees is pre-formed in locking element 30 (detail of area C of FIG. 6 is shown in FIG. 7). In this case, the groove thread form angle (40°, for example) is less than the standard fastener thread form (60°) and the major diameter of thread configuration 29 was pre-formed larger than the maximum major diameter of the bolt 40 (FIGS. 7 and 9). Thread configuration 29 is formed in locking element 30 by cutting or molding, standard fabrication techniques.

The above technique assures that the major diameters do not contact or interfere in a manner that could alter the predictability of consistent results. This less than 60 degree thread form of the locking element now only utilizes the smooth flanks of the fastener's 60 degree thread form to physically interfere with the adjacent smooth surface 50 of thread configuration 29. These two smooth surfaces produce friction that results in a predictable prevailing torque.

FIG. 8 illustrates a bolt, or fastener 40, initially installed into a thread configuration preformed in locking element 30. As shown in the FIG. 9 detail, the fastener major diameter, at the near maximum, is such that a clearance, or gap, 44 exists between locking element 30 and the thread tip 46 of fastener 40. This eliminates the fastener major diameter as a variable in determining removal prevailing torque, the friction, or loading, being determined by the contact between the smooth fastener flanks 48 and the smooth internal thread surface 50 to provide a predictable prevailing torque.

FIG. 10 illustrates the situation when a fastener 40' having a minimum major diameter is inserted into the pre-formed thread configuration after fastener 40 has been removed. As can be observed, an enlarged gap 52 is formed between the pre-formed locking element 30 and the thread tip 54 of the minimum major diameter of fastener 40'. The lines in phantom represent the springback lines.

The present invention also provides a user the ability to adjust and control the prevailing torque value if necessary. For example, if the locking element 30 was preformed with a 40 degree thread form and the prevailing torque was deemed to be too low, then a simple alteration of the thread angle to less than 40 degrees (to 38 degrees for example) in the subsequent production run would raise the prevailing torque value to an acceptable level.

Referring now to FIG. 11, another fastener system using the teachings of the present invention is illustrated. In particular, a bolt 60 having a head portion 62, shank portion 64 and threaded shaft portion 66 is inserted through apertures formed in adjoining parent material layers 68 and 70 as illustrated. A washer 63 may be interposed between the lower surface of head portion 62 and the upper surface of layer 68 as illustrated. A threaded nut 72 having a locking element 74 positioned therein, is shown prior to its installation on threaded shaft portion 66 of bolt 60. FIG. 12 being a detail of a portion of locking element 74 and clearly illustrating pre-formed thread configuration 76, equivalent to thread configuration 29 shown in FIG. 7.

Reference numeral 72' illustrates the situation when nut 72 is installed on threaded shaft portion 66, securing layers 68 and 70 together with a prevailing torque determined, in accordance with the teachings of the invention, by the interaction of the threaded portion 66 of bolt 60 with the pre-formed thread configuration 76 formed in locking element 74' (primed reference numerals 72 and 74 identify identical components, the former representing the installed nut).

FIG. 13 illustrates the maximum diameter of threaded shaft portion 66 of bolt 60 engaging threaded configuration 76 in a manner similar to that shown in FIG. 9, a gap remaining between the tip 80 of the engaging thread on shaft 66 and the inner apex point 82 of threaded configuration 76.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A fastener system comprising:
   a parent material having a hole formed therein;
   a threaded insert positioned in said hole;
   a separate locking element positioned in said threaded insert, said locking element having a thread configuration with a major thread diameter preformed thereon, the angle of said thread configuration determining the prevailing torque of the fastener system; and
   a threaded first bolt having a major thread diameter for installation within said threaded insert, the tip of said major thread diameter of said first bolt not engaging the major diameter of said thread configuration preformed on said locking element after said first bolt is installed in said insert and locking element.

2. The system of claim 1 wherein said thread configuration comprises at least one helical groove extending around the inner diameter of said locking element.

3. The system of claim 2 wherein the angle of said thread configuration is less than 60°.

4. The system of claim 1 wherein said locking element is fabricated from a polymer.

5. The system of claim 1 wherein said locking element is fabricated from a superpolymer.

6. A fastener system comprising:
   a parent material having first and second surfaces and a hole formed therein;
   a threaded first bolt having a major thread diameter positioned through said hole in said parent material, one end thereof extending beyond the second surface of said parent material; and
   a nut secured to the extended end of said bolt, a separate locking element being positioned in said nut, said locking element having a thread configuration with a major thread diameter preformed thereon, the angle of said threaded configuration determining the prevailing torque of said fastener system, the tip of said major thread diameter of said first bolt not engaging the major diameter of said thread configuration preformed on said locking element after said first bolt is installed in said nut and locking element.

7. The system of claim 6 wherein said thread configuration comprises at least one helical groove extending around the inner diameter of said locking element.

8. The system of claim 7 wherein the angle of said thread configuration is less than 60°.

9. The system of claim 6 wherein said locking element is fabricated from a polymer.

10. The system of claim 6 wherein said locking element is fabricated from a superpolymer.

11. A fastener system comprising a parent material having a hole formed therein; a threaded first bolt FC having a threaded shaft portion with a major thread diameter and a member position in said hole having an aperture therein, said aperture having a threaded internal diameter for receiving the threaded shaft portion of said bolt, a separate locking element being positioned in said apertured member and having a thread configuration preformed thereon, the angle of said thread configuration determining the prevailing torque of said fastener system, the tip of said major thread diameter of said first bolt not engaging the major diameter of said thread configuration preformed on said locking element after said first bolt is installed in said apertured member and said locking element.

12. The system of claim 11 wherein said thread configuration comprises at least one helical groove extending around the inner diameter of said locking element.

13. The system of claim 12 wherein the angle of said thread configuration is less than 60°.

14. The system of claim 11 wherein said locking element is fabricated from a polymer.

15. The system of claim 11 wherein said locking element is fabricated from a superpolymer.

16. A fastener system comprising:

a parent material having a hole formed therein;

a threaded insert positioned in said hole;

a separate locking element positioned in said threaded insert, said locking element having a thread configuration with a major thread diameter preformed thereon, the angle of said thread configuration determining the prevailing torque of the fastener system;

a threaded first bolt having a major thread diameter for installation within said threaded insert, the tip of said major thread diameter of said first bolt not engaging the major diameter of said thread configuration after said first bolt is installed in said insert and locking element; and a second bolt of a major thread diameter different than the major thread diameter of said first bolt, the tip of said major thread diameter of said second bolt not engaging the major diameter of said thread configuration preformed on said locking element when said second bolt is installed within said threaded insert and locking element.

17. A fastener system comprising:

a parent material having first and second surfaces and a hole formed therein;

a threaded first bolt having a major thread diameter positioned through said hole in said parent material, one end thereof extending beyond the second surface of said parent material;

a nut secured to the extended end of said bolt, a separate locking element being positioned in said nut, said locking element having a thread configuration with a major thread diameter preformed thereon, the angle of said threaded configuration determining the prevailing torque of said fastener system, the tip of said major thread diameter of said first bolt not engaging the major diameter of said thread configuration after said first bolt is installed in said nut and locking element; and a second bolt of a major thread diameter different than the major thread diameter of said first bolt, the tip of said major thread diameter of said second bolt not engaging the major diameter of said thread configuration preformed on said locking element when said second bolt is installed within said nut and locking element.

18. A fastener system comprising a parent material having a hole formed therein; a threaded first bolts FC having a threaded shaft portion with a major thread diameter and a member position in said hole having an aperture therein, said aperture having a threaded internal diameter for receiving the threaded shaft portion of said bolt, a separate locking element being positioned in said apertured member and having a thread configuration with a major thread diameter preformed thereon, the angle of said thread configuration determining the prevailing torque of said fastener system, the tip of said major thread diameter of said first bolt not engaging the major diameter of said thread configuration after said first bolt is installed in said apertured member and said locking element, and a second bolt of a major thread diameter different than the major thread diameter of said first bolt, the tip of said major thread diameter of said second bolt not engaging the major diameter of said thread configuration preformed on said locking element when said second bolt is installed within said apertured member and said locking element.

* * * * *